(12) United States Patent
Matsui et al.

(10) Patent No.: US 8,045,860 B2
(45) Date of Patent: Oct. 25, 2011

(54) OPTICAL TRANSCEIVER

(75) Inventors: Kensuke Matsui, Kawasaki (JP); Takahiro Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 12/318,526

(22) Filed: Dec. 30, 2008

(65) Prior Publication Data

US 2009/0297160 A1    Dec. 3, 2009

(30) Foreign Application Priority Data

May 29, 2008   (JP) .................................. 2008-141494

(51) Int. Cl.
    *H04B 10/00*   (2006.01)
(52) U.S. Cl. .......... 398/135; 398/202; 398/177; 398/33; 398/38
(58) Field of Classification Search .................. 398/135, 398/177, 202, 33, 38, 25, 22, 24
    See application file for complete search history.

(56) References Cited

U.S. PATENT DOCUMENTS

| | | | | |
|---|---|---|---|---|
| 4,924,081 | A * | 5/1990 | Arima et al. | 250/214 R |
| 6,599,039 | B1 * | 7/2003 | Nakazato | 398/25 |
| 6,894,266 | B2 * | 5/2005 | Richard et al. | 250/214 R |
| 7,630,651 | B2 * | 12/2009 | Shimizu et al. | 398/198 |
| 7,668,512 | B2 * | 2/2010 | Woolf et al. | 455/67.11 |
| 7,912,375 | B2 * | 3/2011 | Kondo et al. | 398/135 |
| 2007/0072451 | A1 * | 3/2007 | Tazawa et al. | 439/76.1 |
| 2007/0166041 | A1 * | 7/2007 | Le et al. | 398/135 |
| 2008/0088915 | A1 * | 4/2008 | Hayashi et al. | 359/334 |
| 2008/0193140 | A1 * | 8/2008 | Liu et al. | 398/135 |
| 2008/0205902 | A1 * | 8/2008 | Moriwaki et al. | 398/182 |
| 2008/0278717 | A1 * | 11/2008 | Makuuchi et al. | 356/237.4 |
| 2009/0304384 | A1 * | 12/2009 | Li | 398/58 |

FOREIGN PATENT DOCUMENTS

| | | |
|---|---|---|
| JP | 7-43211 | 2/1995 |
| JP | 2560747 | 9/1996 |
| JP | 11-183273 | 7/1999 |

* cited by examiner

*Primary Examiner* — Ken Vanderpuye
*Assistant Examiner* — Hibret Woldekidan
(74) *Attorney, Agent, or Firm* — Staas & Halsey LLP (57) ABSTRACT

An optical transceiver stores an output A/D value which is A/D-converted from reference voltage in an EEPROM as correction data in preparing the optical transceiver. The optical transceiver, receiving a request for outputting a monitored value from an external device connected therewith, calculates a variation based on difference between the output A/D value which is A/D-converted from the reference voltage at the timing when the request for outputting the monitored value is received and the correction data stored in the EEPROM. Then, the optical transceiver uses the calculated variation to convert current of light-input power which is input thereinto into voltage, amplify the voltage, and A/D-convert the voltage to thereby correct the output A/D value. The optical transceiver outputs the corrected A/D value to the connected external device as the monitored value.

3 Claims, 8 Drawing Sheets

OPTICAL TRANSCEIVER

CROSS-REFERENCE TO RELATED APPLICATIONS

This application is based upon and claims the benefit of priority of the prior Japanese Patent Application No. 2008-141494, filed on May 29, 2008, the entire contents of which are incorporated herein by reference.

BACKGROUND

1. Field

The present invention relates to an optical transceiver which monitors an input-light power which is input thereinto and outputs a monitored value.

2. Description of the Related Art

Recently, optical fiber has been used for a transmission path of the Internet traffic using Internet Protocol (IP), which has become widely used in a short time, and a transmission service which can transmit and receive a large amount of data is spreading.

An optical transceiver which transmits and receives a light signal via the optical fiber has been advancing in terms of MSA (Multi Source Agreement: industry standard) for downsizing and higher density of the optical transceiver, and for a stable supply of the optical transmission. Further, there are industry standardizations for downsizing and a shape such as SFF (Small Form Factor), SFP (Small Form Factor Pluggable) or the like.

SFP-MSA, a combination of the above standardizations, defines a DDM (Digital Diagnostic Monitor) function which monitors temperature, power supply voltage, bias current in LD (Laser Diode), output power (transmitting unit), and an input power (receiving unit), to thereby output the monitored information as digital values.

In general, the DDM function for the light-input power detects the current flowing through a light-receiving device PD (Photo Diode), and amplifies the same, performs an A/D conversion to convert the amplified current into the digital value, and then outputs the digital value. A result is obtained by calculating based on the output value using a predetermined calculation formula, whereby an user can check the intensity of the light which is input to the receiving unit.

Figure 6:
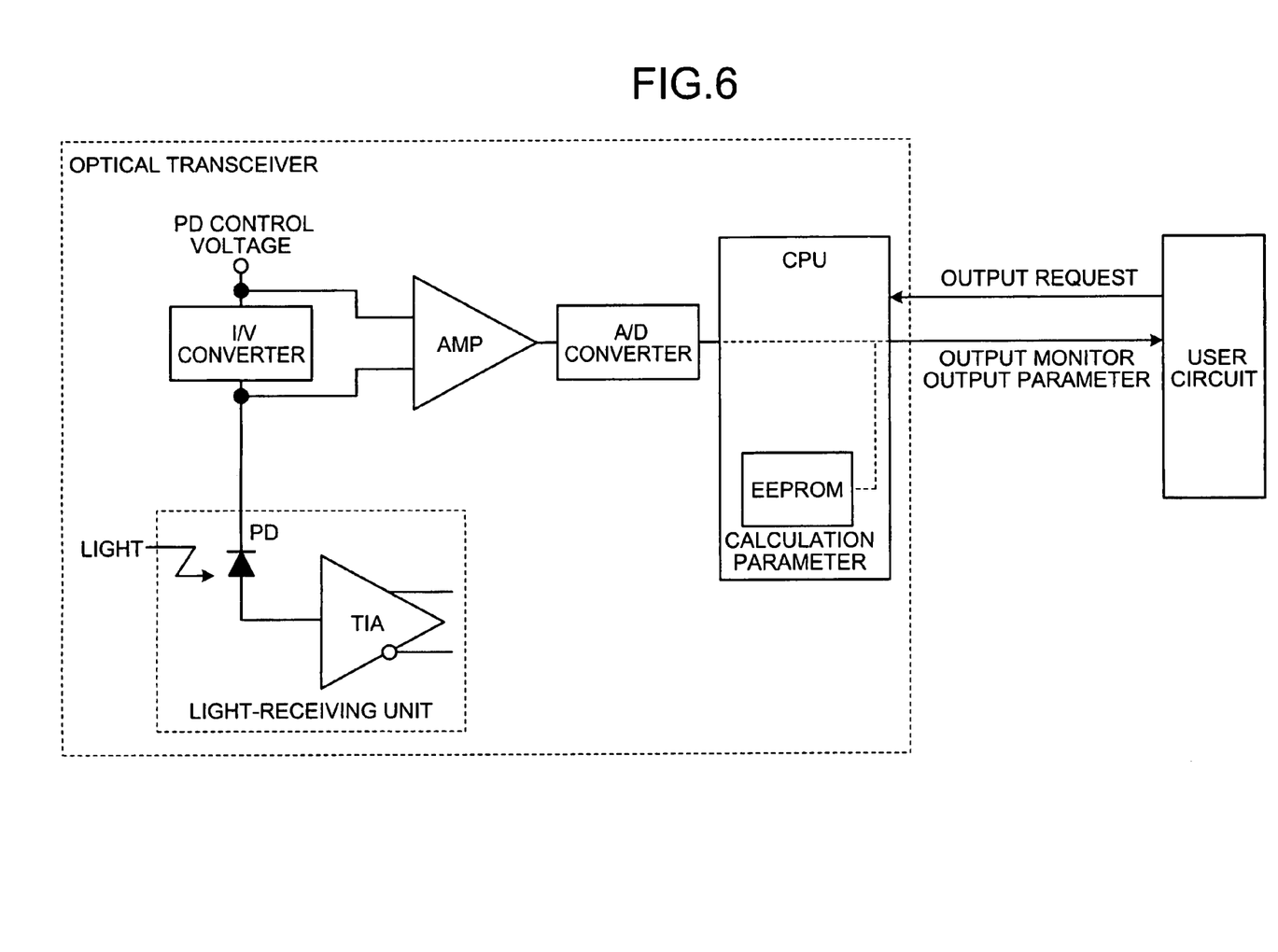
FIG. 6 shows an example configuration of an optical transceiver according to a conventional art.

A configuration of the light transceiver which outputs the monitored value using the above-described DDM function is described with reference to FIG. 6. FIG. 6 shows an example configuration of the light transceiver according to the conventional art. As shown in FIG. 6, the light transceiver receives a request for outputting the intensity of light via an apparatus (user circuit) connected therewith using two-wire interface. When light-input power is input to a light-receiving unit, a current following through PD is detected by an I/V converter. Then, the light transceiver, which has received the output request, converts the current into voltage. After that, the light transceiver converts voltage amplified by an amplifier (AMP) into a digital value via an A/D converter.

Further, a parameter is stored in a predetermined area of an EEPROM (Electrically Erasable and Programmable Read Only Memory), which is a nonvolatile memory which can delete/rewrite data by controlling electricity (voltage). After the description above, the light transceiver outputs the parameter and the converted value (monitored value) to the user circuit. The parameter stored in the EEPROM is set for each light transceiver during a production (preparation) of the light transceiver. For example, the parameter can be obtained by changing and performing A/D conversion on the light-input power several times, and calculating an approximate curve of the output monitored value.

Figure 7:
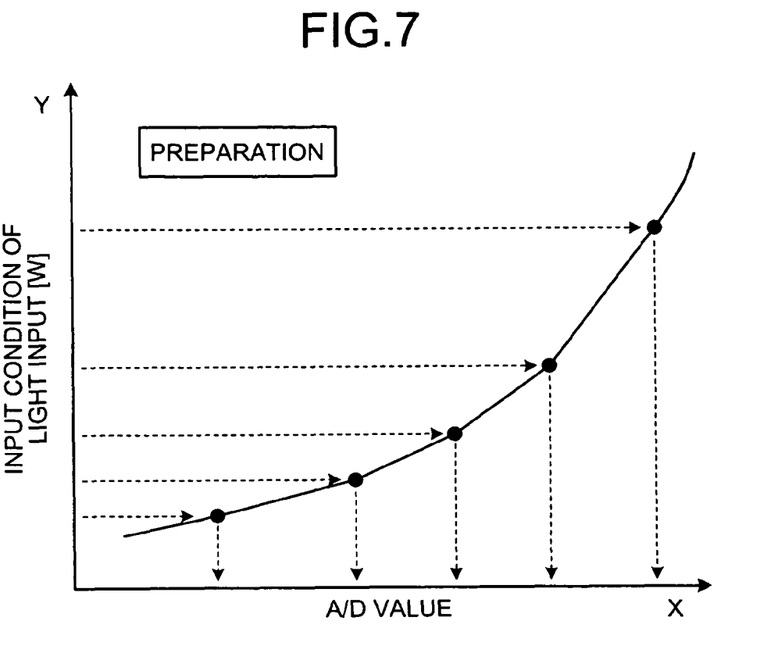
FIG. 7 is an illustration of preparing a monitoring of light-input power according to the conventional art.
Figure 8:
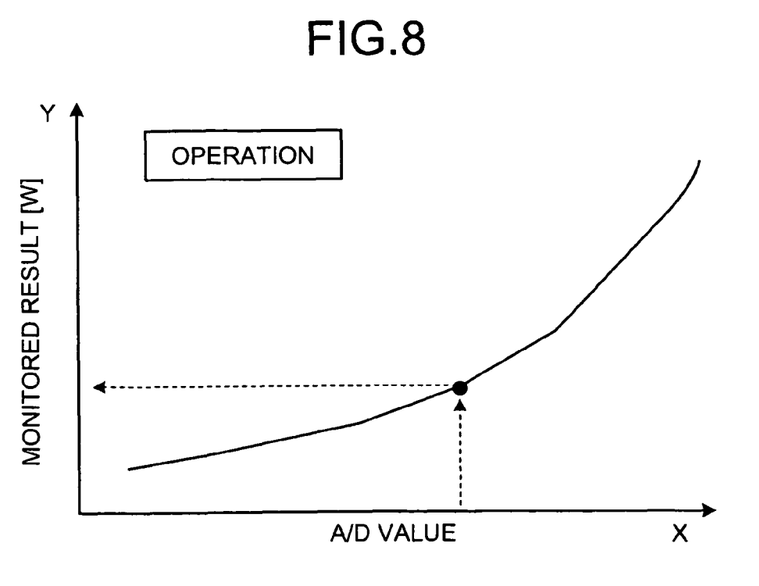
FIG. 8 is an illustration of operating the monitoring of light-input power according to the conventional art.

The calculation of the intensity of light based on the above-described approximate curve is described specifically. As shown in FIG. 7, the monitored values which are A/D-converted and output are set as input conditions of the light input (W), and the parameters (A to E) in Equation. 1 are calculated and stored in the EEPROM in preparing the light transceiver. In operating the light transceiver, as shown in FIG. 8, the monitored values (output values (X) of the A/D conversion) output from the light-receiving apparatus and the parameters are assigned to variables in Equation (1) to thereby obtain the intensity of light (light-input power (Y)). FIG. 7 is an illustration of preparation of a light-input-power monitor according to the conventional art. FIG. 8 is an illustration of operation of the light-input power monitor according to the conventional art.

$$Y = A \times X4 + B \times X3 + C \times X2 + D \times X + E \quad (1)$$

Since demand for the dynamic range and accuracy differs depending on a user, the monitoring function needs to suppress errors. There have been disclosed various technologies for suppressing errors of the monitored value which is output by the optical transceiver (e.g., see Japanese Patent Application Laid-Open Nos. H11-183273 and H7-43211, and Japanese Patent No. 2560747).

Figure 9:
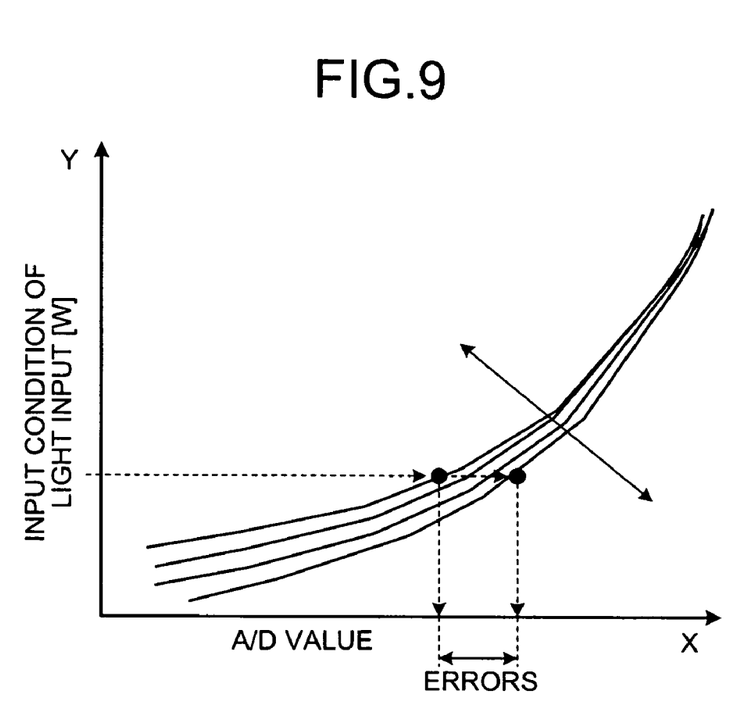
FIG. 9 is an illustration of errors of the monitored values according to the conventional art.

In the conventional art described above, however, drift of the A/D converter is not considered. Specifically, as shown in FIG. 9, when the optical transceiver operates under temperature different from the temperature in preparing the optical transceiver, an A/D value of fluctuates due to each circuit error. FIG. 9 is an illustration of the errors of the monitored values according to the conventional art.

The A/D value output from the optical transceiver fluctuates depending on surrounding temperature even if the light-input power does not change. Since the parameters set in the EEPROM are constant values set in preparing the optical transceiver, the monitored values are to include errors when the output A/D value fluctuates. Thus, the monitored values include errors due to the surrounding environment, resulting in reduced accuracy of the monitoring.

Factors which cause the errors of the monitoring are driving condition of the light-receiving device (PD), temperature drift of the AMP and A/D converter, and the like. Particularly, when the light-input power is small, the monitoring is highly influenced by the temperature drift, quantizing errors, and the like of the A/D-converter, resulting in possibly reduced accuracy of the monitoring, and thus causing a problem in widening the dynamic range.

SUMMARY

It is an object of the present invention to at least partially solve the problems in the conventional technology.

According to an aspect of an embodiment, an optical transceiver includes a correction-data storage unit that stores therein a digital value of reference voltage obtained from a reference voltage source which supplies a reference voltage for an operation of a control circuit in preparing the optical transceiver; a reference-voltage converter that obtains, when a request for outputting the reference voltage is obtained from an external device connected with the optical transceiver after the preparation of the optical transceiver, the reference voltage from the reference voltage source, and converts the obtained reference voltage into a digital value; a variation calculating unit that calculates a variation of an output characteristic based on a difference between the digital value of the reference voltage converted by the reference-voltage converter and the correction data stored in the correction-data storage unit; an input-light-voltage converter that converts a current which fluctuates depending on an intensity of the input light, into a voltage, amplifies the voltage; and converts the obtained voltage into a digital value; and an output unit that corrects the digital value converted by the input-light-voltage converter based on the digital value of the voltage converted by the input-light-voltage converter and on the variation calculated by the variation calculating unit, and outputs the corrected digital value as a monitored value to the connected external device.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Exemplary embodiments of a light transceiver are described in detail below with reference to accompanying drawings. An overall configuration of the optical transceiver, and a configuration and a procedure of the optical transceiver are described in this order, and an effect of the present embodiment is described at last.

Overall Configuration of Optical Transceiver

Figure 1:
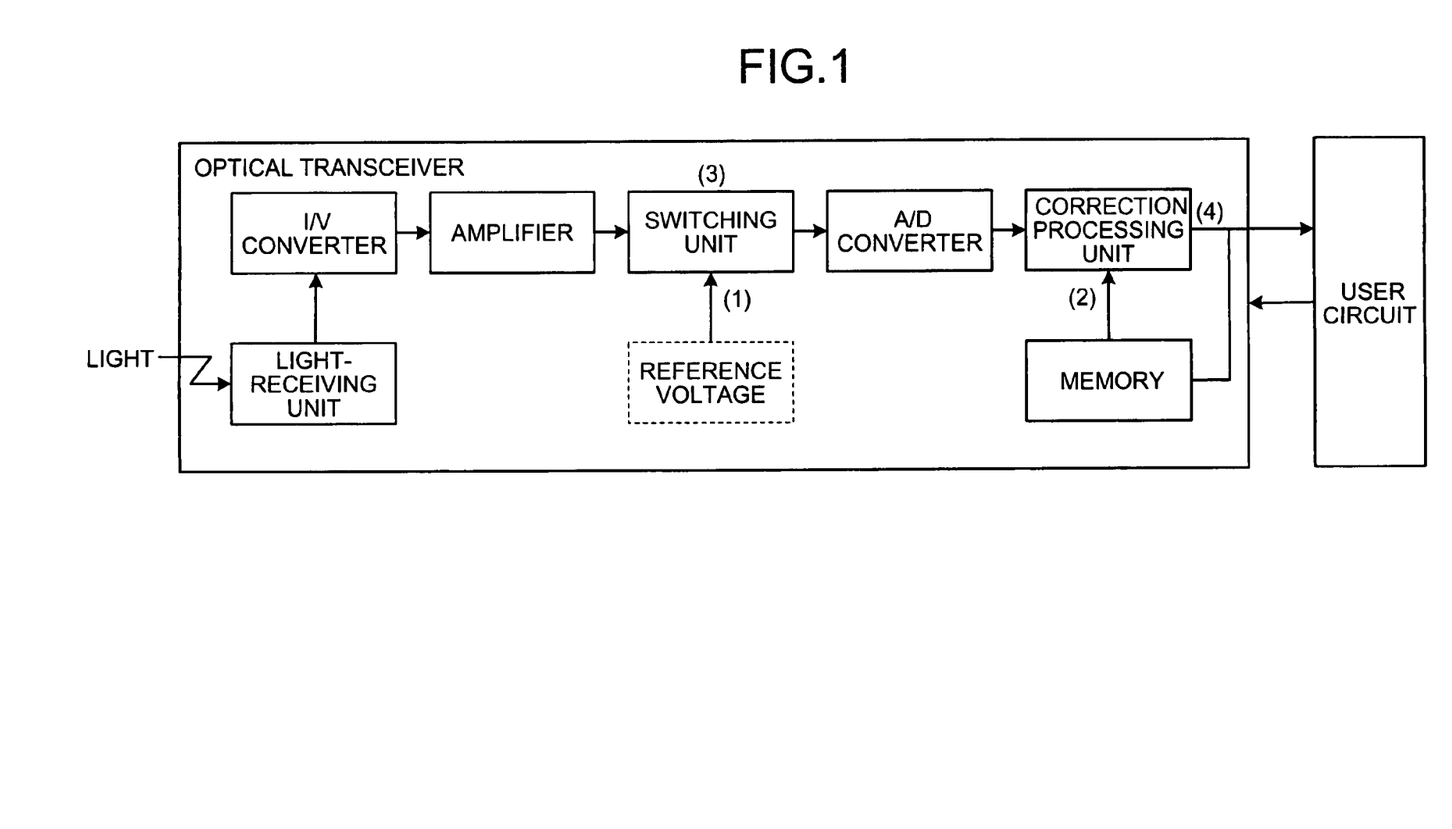
FIG. 1 shows an overall configuration of an optical transceiver according to a first embodiment.

Firstly, an overall configuration of an optical transceiver according to a first embodiment is described with referent to FIG. 1. FIG. 1 shows the overall configuration of the optical transceiver according to the first embodiment.

The optical transceiver disclosed in the present description receives a request for outputting the monitored value of the optical component from the user circuit connected via the two-wire interface, and outputs the monitored value of the light-input power which is input into the optical transceiver.

As shown in FIG. 1, the optical transceiver includes a storage unit (memory) which stored correction data, a light-receiving unit which receives light input which is input thereinto, an I/V converter which converts current into voltage, an amplifier which amplifies voltage, a switching unit which switches connections, an A/D converter which performs A/D conversion (i.e., conversion from analogue to digital), and a correction processing unit which corrects errors of the monitored values.

An outline of the optical transceiver configured as above is to monitor light-input power, and output the monitored values, particularly so as to enhance accuracy of monitoring the light-input power and suppress errors of the output monitored values.

Specifically, the light transceiver stores as correction data an output value which is output in preparing the optical transceiver. For example, in preparing the optical transceiver, the optical transceiver A/D-converts a reference voltage for operating a control circuit, and stores an output value "120" which is output in a predetermined memory as correction data.

Since the correction data stored in the predetermined memory is required to be a reference value, the correction data is obtained under surrounding where temperature hardly changes. Further, since the reference voltage is correction data for correcting fluctuation of the monitored value caused due to surrounding environment, the A/D converter, or the like, the reference voltage is set at the value around the value which is output by the amplifier when the light-input power into the optical transceiver is around a lower limit thereof. The predetermined memory also stores parameters needed for calculation at the user circuit.

Then, after the preparation of the optical transceiver, when the optical transceiver receives the request for outputting the monitored values from a connected external device, the optical transceiver receives reference voltage and converts the same into a digital value (see (1) in FIG. 1).

Specifically, when the optical transceiver receives the request for outputting the monitored value after storing the correction data in the predetermined memory, the optical transceiver switches the connection of the switching unit to the reference-voltage-supply side. The optical transceiver, connected with the reference-voltage-supply side, receives reference voltage, and A/D-converts the voltage into a digital value "121" via the A/D converter.

The optical transceiver calculates variation of output characteristic based on difference between the converted digital value of the reference voltage and the correction data stored in the predetermined memory (see (2) in FIG. 1).

To give a specific description with the example above, when the reference voltage is A/D-converted into the digital value "121", the optical transceiver obtains the correction data "120" stored in the memory from the correction processing unit. The optical transceiver calculates the variation "1" of the output characteristic via the correction processing unit based on the difference (subtraction of the correction data from the reference voltage) between the A/D-converted digital value "121" of the reference voltage and the obtained correction data "120".

Then, the optical transceiver receives voltage which is converted from current, which fluctuates depending on intensity of input light, and amplified, and the optical transceiver converts the digital value (see (3) in FIG. 1).

To give a specific description with the example above, when the variation is calculated based on the reference voltage and the correction data, the optical transceiver switches the connection of a connecting unit from the reference-voltage-supply side to a light-receiving-device side (PD: Photo Diode). The optical transceiver converts PD current, which fluctuates depending on the intensity of light input into the light-receiving unit, into voltage via the I/V converter, and amplifies the voltage via the amplifier. The optical transceiver, receiving the amplified voltage, A/D-converts the voltage into a digital value "150" via the A/D converter.

Then, the optical transceiver corrects the converted digital value of voltage based on the converted digital value of voltage and the calculated variation, and outputs the corrected digital value to the connected external device as the monitored value.

To give a specific description with the example above, the optical transceiver corrects the converted digital value of voltage on the light-receiving-device side based on the A/D-converted digital value "150" of voltage on the light-receiving-device side and the calculated variation "1" on the reference-voltage-supply side, to thereby calculate the digital value "149". The optical transceiver outputs the corrected digital value "149" of voltage on the light-receiving-device side and the calculation parameters to the user circuit connected therewith as the monitored value. The user circuit, receiving the corrected monitored value, performs processes such as providing the intensity of light to a user, and controlling connection referring to connection status of light. Thus, the optical transceiver outputs the corrected value "149", which is obtained by subtracting "1" from the output monitored value, as the monitored value because the voltage is higher by "1" than the voltage on the reference-voltage-supply side.

As described, the optical transceiver according to the first embodiment previously stores the output value obtained from the reference voltage in preparing the optical transceiver. When the optical transceiver receives the request for outputting the monitored value, the optical transceiver obtains the output value of the reference voltage, and calculates the variation of the reference voltage based on the difference between the obtained reference voltage and the correction data previously stored. The optical transceiver corrects the A/D value based on the calculated variation and the A/D value of the light-input power which is input thereinto, and outputs the monitored value. Thus, the optical receiver can enhance accuracy of monitoring the light-input power, and suppress errors of the output monitored value.

The optical transceiver corrects errors of the output monitored values of the light-input power based on the variation between the output value obtained from the reference voltage in preparing the optical transceiver and the output value of the reference voltage in receiving the request for outputting the monitored value from the connected user circuit. Even under the temperature different from that in obtaining the reference voltage as the correction data, the optical transceiver can correct errors of the output value caused due to the surrounding environment. Thus, the optical transceiver can enhance accuracy of monitoring the input-light power and suppress the errors of the output monitored values.

Configuration of Optical Transceiver according to First Embodiment

Figure 2:
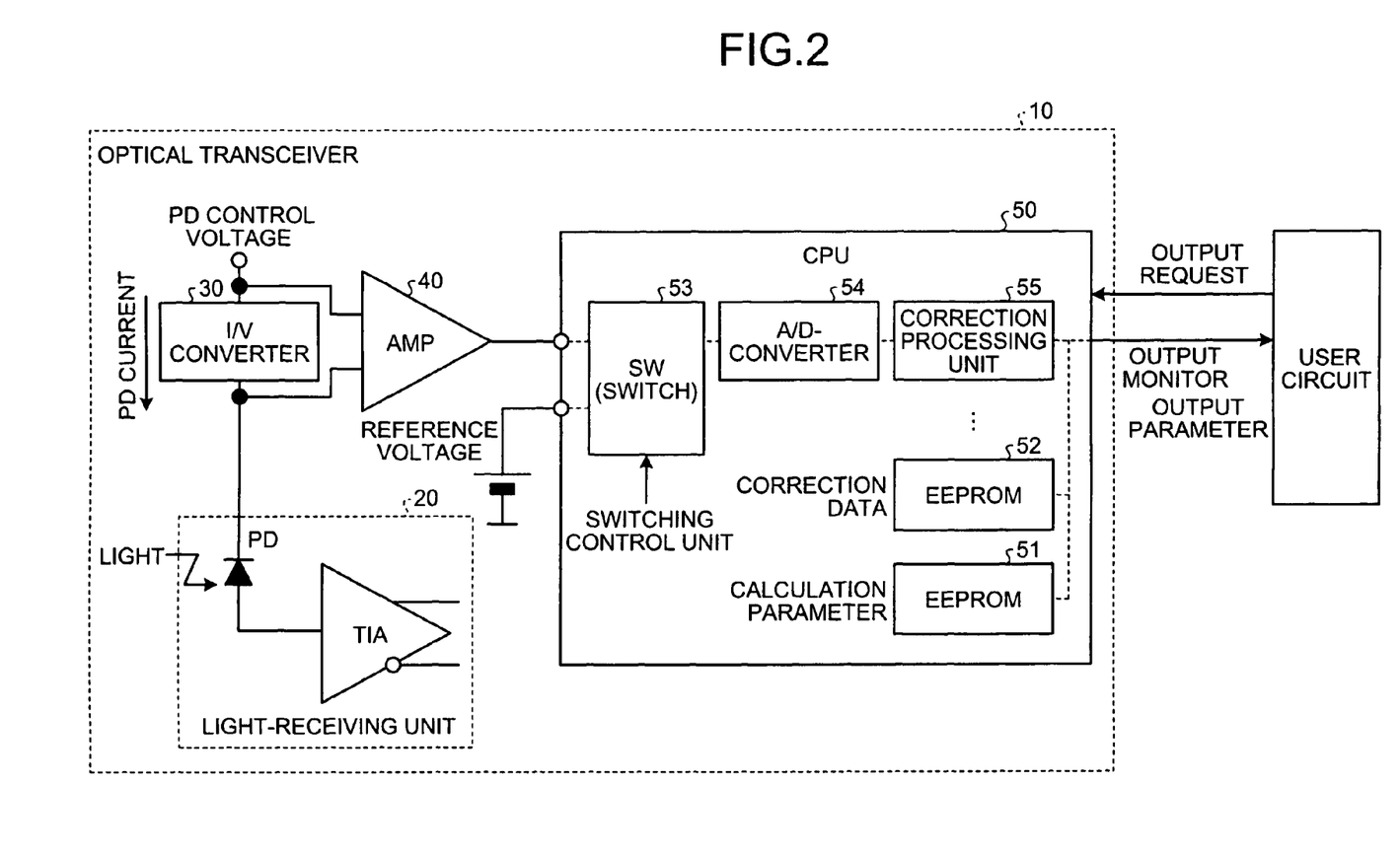
FIG. 2 shows a configuration of the optical transceiver according to the first embodiment.

A configuration of the optical transceiver according to the first embodiment is described with reference to FIG. 2. FIG. 2 shows the configuration of the optical transceiver according to the first embodiment.

As shown in FIG. 2, an optical transceiver 10 includes a light-receiving unit 20, an I/V converter 30, an amplifier 40, and a CPU50. The optical transceiver outputs the light-input power which is input thereinto when receiving the request for outputting the monitored value from the connected external device (user circuit).

The light-receiving unit 20 receives light-input power which is input into the optical transceiver 10. For example, the light-receiving unit 20 uses TIA (Trans-Impedance Amplifier) to detect bias current (PD current) flowing through light-receiving device for receiving the light-input power which is input into the optical transceiver 10, and to amplify the current, and the light-receiving unit 20 converts the current into voltage. In the optical transceiver 10, the light-receiving device (PD) is biased by PD control voltage, and the current (PD current) flowing through the optical transceiver 10 fluctuates depending on the intensity of light input into the light-receiving unit 20. For example, when the intensity of light is high, the PD current increases whereas when the intensity of light is low, the PD current decreases.

The I/V converter 30 converts the current flowing through the optical transceiver 10 into voltage, and the amplifier 40 amplifies the voltage converted by the I/V converter 30. For example, the I/V converter 30 converts the PD current, which fluctuates depending on the light-input power flowing through the bias circuit in the optical transceiver, and the amplifier 40 amplifies the PD current converted by the I/V converter 30.

The CPU 50 includes an internal memory for storing a control program, programs which determine various procedures, and necessary data. The CPU 50, particularly, includes an EEPROM 51, an EEPROM 52, a switch control unit (SW) 53, an A/D converter 54, and a correction processing unit 55, and performs various processes with those components.

The EEPROM 51 is a kind of a volatile memory, which can delete/rewrite data by controlling electricity (voltage). The EEPROM 51 stores calculation parameters needed for calculating the intensity of light at the user circuit. The EEPROM 52 stores as the correction data the digital value of the reference voltage obtained from a reference voltage source which supplies the reference voltage by the operation of the control circuit in preparing the optical transceiver 10.

Figure 3:
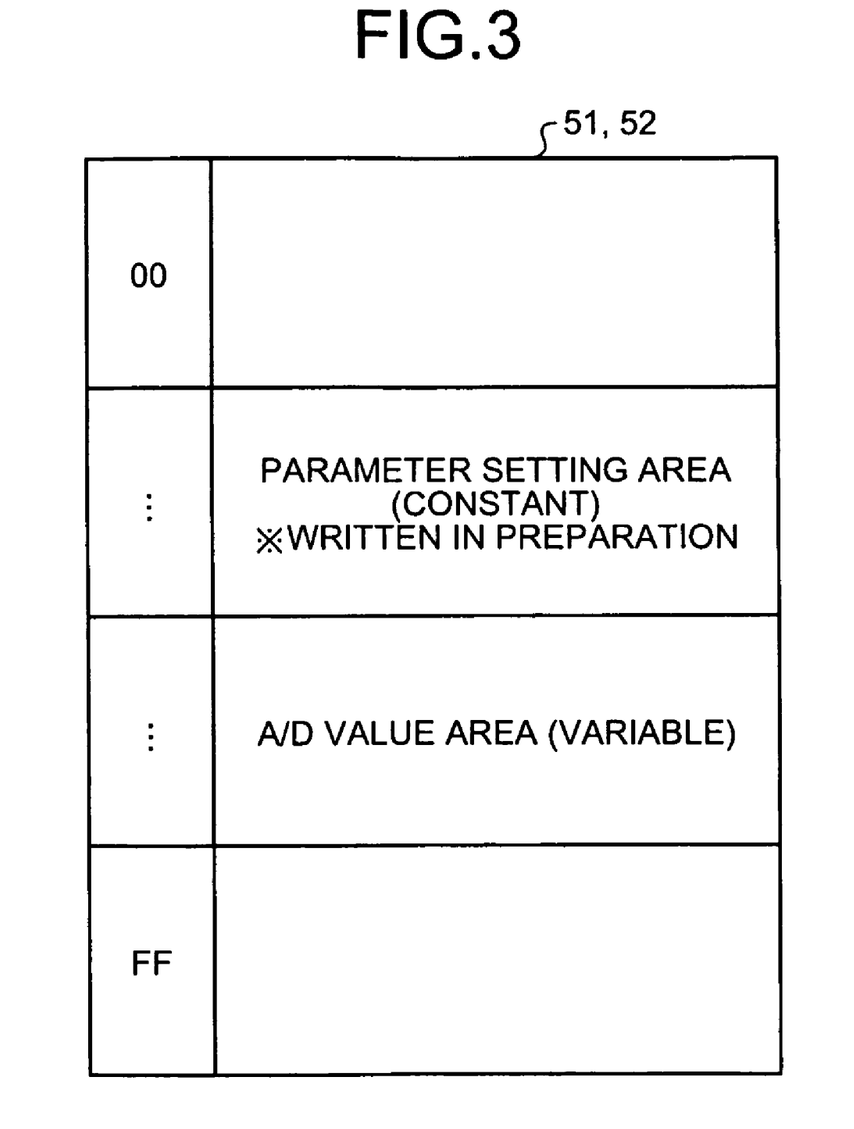
FIG. 3 shows an example data structure of an EEPROM.

Specifically, as shown in FIG. 3, the EEPROMs 51 and 52 have an area of addresses 00 to FF called memory map, respectively. Each of the areas stores a serial number, control information, and the like of the optical transceiver 10. For example, the EEPROM 51 stores calculation parameters in the parameter setting area (constant of the calculation parameter) shown in FIG. 3. Further, the EEPROM 52 stores the correction data "120" in the A/D value area (variable which is A/D-converted from the reference voltage) shown in FIG. 3. FIG. 3 shows an example data structure of the EEPROM.

The switch control unit 53 switches connection either to a side of voltage amplified by the amplifier 40, or to a reference-voltage-supply side which supplies voltage supply used as a reference for the operation of control circuit. For example, when the switch control unit 53 receives a request for outputting the monitored value from the user circuit, the switch control unit 53 performs control to switch the connection to the reference-voltage-supply side. Further, for example, when the correction processing unit 55 described later calculates variation, the switch control unit 53 performs control to switch the connection to the amplifier 40 side. Since the reference voltage source connected with the switch control unit 53 is used for correcting variation of the monitored value caused by the surrounding environment and the A/D converter 54 described later, the reference voltage is set to the value which is output by the amplifier 40 when the light-input power into the optical transceiver 10 is around a lower limit thereof.

The A/D converter 54 converts the reference voltage into a digital value when the connection of the switch control unit 53 is set to the reference-voltage-supply side. For example, when connected with the reference-voltage side via the switch control unit 53, the A/D converter 54 A/D-converts the received reference voltage, and outputs the digital value "121".

The A/D converter 54 converts the voltage which is amplified by the amplifier 40 and which corresponds to input light into a digital value. For example, the A/D-converter 54 A/D-converts, if connected with the amplifier side via the switch control unit 53, the voltage which is amplified by the amplifier 40 and which corresponds to the input light into the digital value "150".

The correction processing unit 55 calculates the variation of output characteristic based on difference between the digital value of the reference voltage converted by the A/D converter 54 and the correction data stored in the EEPROM 52. For example, the correction processing unit 55 calculates the variation "1" of output characteristic based on the difference (subtraction of the correction data from the reference voltage) between the digital value "121" of the reference voltage A/D-converted by the A/D converter 54 and the correction data "121" stored in the EEPROM 52.

The correction processing unit 55 corrects the digital value of the voltage converted by the A/D converter 54 based on the digital value of voltage converted by the A/D-converter and the calculated variation. The correction processing unit 55 outputs the corrected digital value to the connected user circuit as the monitored value.

For example, the correction processing unit 55 corrects the converted digital value of the voltage corresponding to the input light based on the digital value "150" of voltage which corresponds to the input light and which is converted by the A/D-converter 54 and the calculated variation "1" on the reference-voltage-supply side, to thereby calculate the value "149". The correction processing unit 55 outputs as the monitored value the corrected digital value "149" of voltage corresponding to the input light, and the calculation parameter stored in the EEPROM 51 to the connected user circuit. Thus, since the monitored value to be output is higher by the variation "1", the correction processing unit 55 subtracts the variation "1" from the A/D value "150" received from the AMP 40 side, and outputs the monitored value "149" as a definite output value.

Correction Timing of Monitored Value

Figure 4:
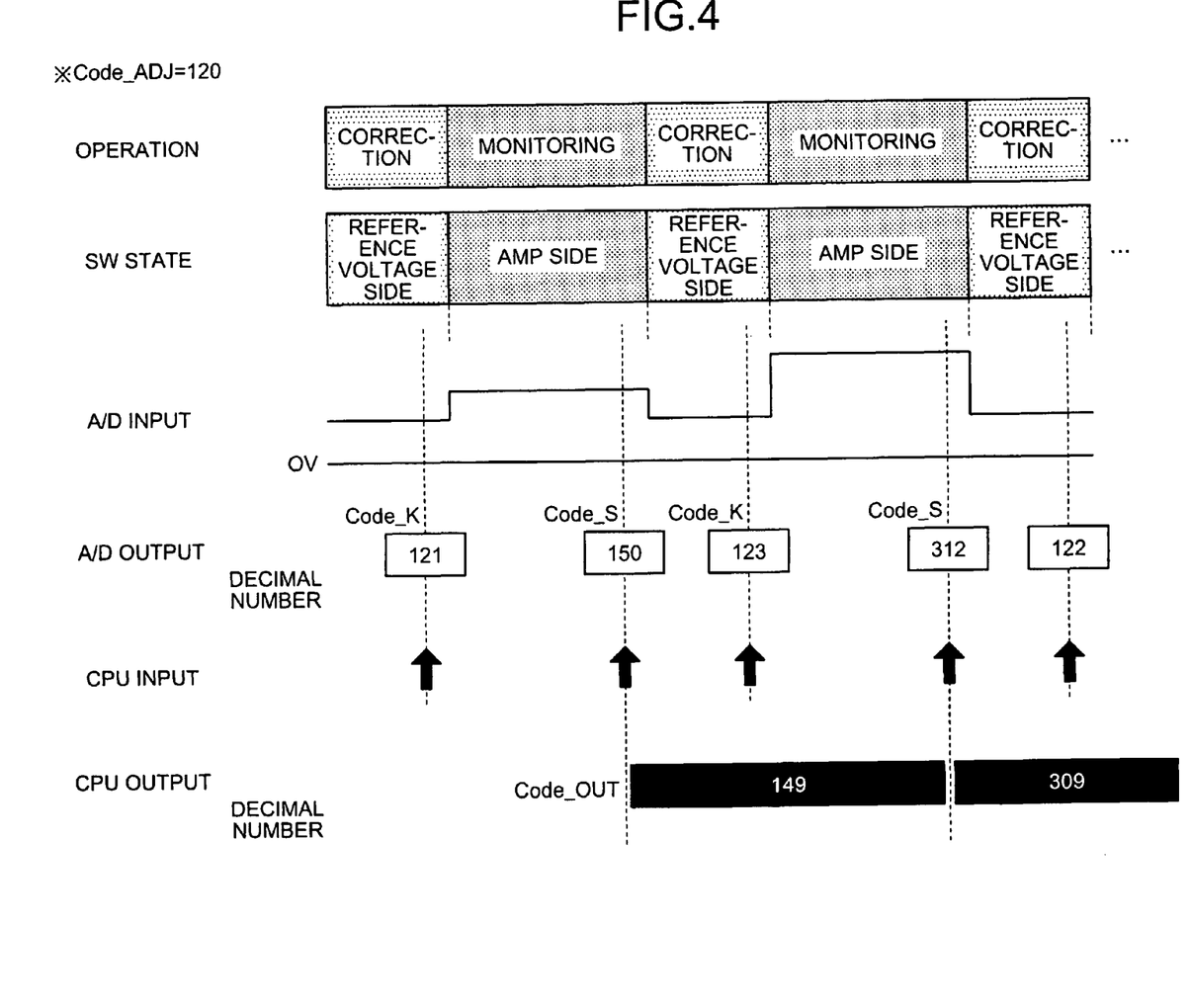
FIG. 4 is an illustration of an example correction timing of a monitored value output by the optical transceiver according to the first embodiment.

A timing of a correction process of the monitored value to be output by the optical transceiver 10 according to the first embodiment is described with reference to FIG. 1. FIG. 4 is an illustration of an example correction timing of the monitored value to be output by the optical transceiver 10 according to the first embodiment. In the description below, the correction data obtained in preparing the optical transceiver 10 is "Code_ADJ=120", the value A/D-converted from the reference voltage is "Code_K", the difference between the correction data and the value A/D-converted from the reference voltage is "Code_KSI", the value A/D-converted from the voltage of input light is "Code_S", and the output monitored value is "Code_OUT".

As shown in FIG. 4, when the optical transceiver 10 receives the request for outputting the monitored value from the connected user circuit, the optical transceiver 10 obtains the correction data "Code_ADJ=120" stored in the EEPROM 52. The optical transceiver 10 switches the connection to the reference-voltage-supply side, and obtains the output value "Code_K=121" which is A/D-converted from the received reference voltage.

Then, the optical transceiver 10 calculates the variation "Kode_KSI=1" of output characteristic based on the difference "Code_K−Code_ADJ=1" between the obtained correction data "Code ADJ=120" and the value "121" which is A/D-converted from the reference voltage.

After that, the optical transceiver 10 switches the connection to a PD-current side of light-input power which is input thereinto, and monitors the PD-current side, to thereby obtain the value "Code_S=150" which is A/D converted from the voltage of input light.

The optical transceiver 10 corrects the value A/D-converted from the voltage of input light based on the obtained value "Code_S=150" and the calculated variation "Code_KSI=1" ("Code_S−Code_KSI=149"). Then, the optical transceiver 10 outputs the corrected A/D value as the monitored value "Code_OUT=149" and the calculation parameter stored in the EEPROM 51 to the connected user circuit.

When the optical transceiver 10 receives the request for outputting the monitored value from the connected user circuit, the optical transceiver 10 obtains the correction data "Code_ADJ=120" stored in the EEPROM 52. Then, the optical transceiver 10 switches the connection to the reference-voltage-supply side, and obtains the output value "Code_K=123" which is A/D-converted from the received reference voltage.

Then, the optical transceiver 10 calculates the variation "Code_KSI=3" of output characteristic based on the difference "Code_K−Code_ADJ=3" between the obtained correction data "Code_ADJ=120" and the value "123" which is A/D-converted from the reference voltage.

After that, the optical transceiver 10 switches the connection to the side of PD current of light-input power, and monitors the PD-current side to thereby obtain the value "Code_S=312" which is A/D-converted from the voltage of input light.

The optical transceiver 10 corrects the value which is A/D-converted from the voltage of input light based on the obtained value "Code_S=312" and the calculated variation "Code_KSI=3" ("Code_S−Code_KSI=309"). Then, the optical transceiver 10 outputs the corrected A/D value as the monitored value "Code_OUT=309" and the calculation parameter stored in the EEPROM 51 to the connected user circuit.

Thus, the optical transceiver 10 calculates the variation of the A/D value, and corrects the monitored value using the calculated variation every time the optical transceiver 10 outputs the monitored value.

Figure 5:
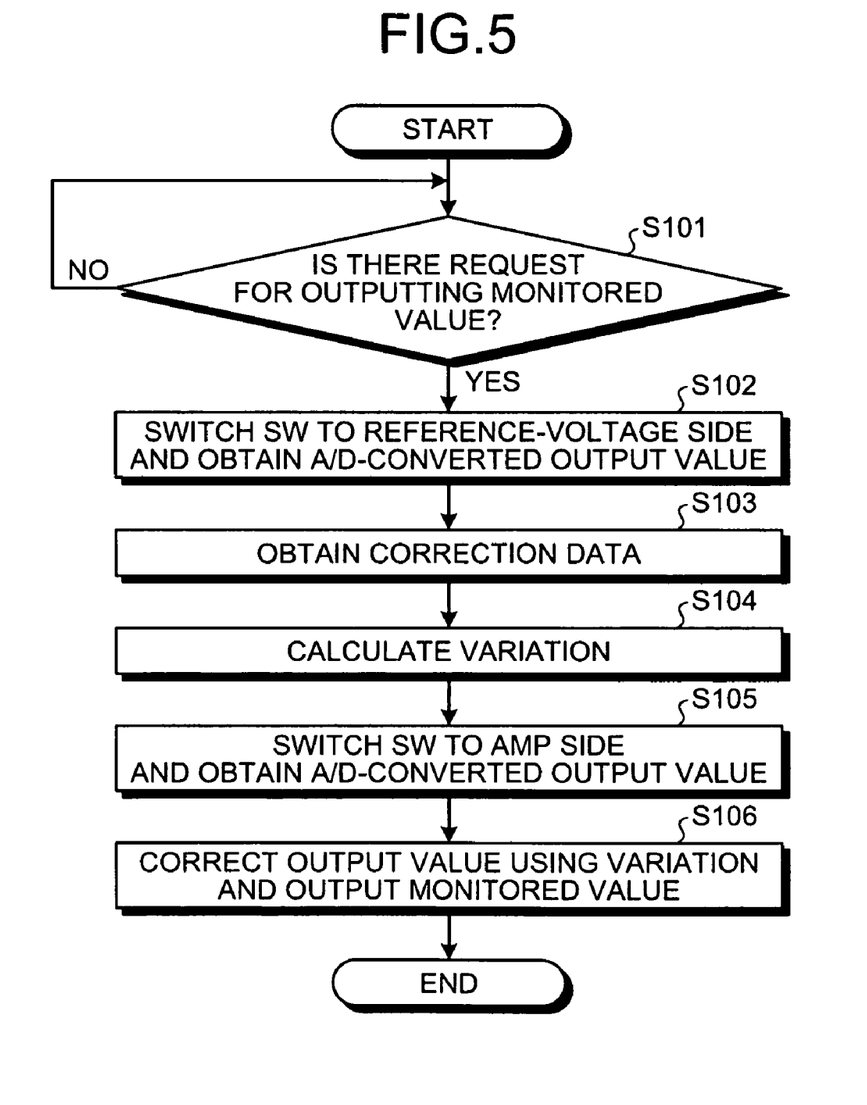
FIG. 5 is a flowchart explaining a procedure from beginning to an end of outputting the monitored value by the optical transceiver according to the first embodiment.

Process from Beginning to End of Outputting Monitored Value According to First Embodiment A procedure from beginning to an end of outputting the monitored value by the optical transceiver 10 according to the first embodiment is described with reference to FIG. 5. FIG. 5 is a flowchart explaining a procedure from beginning to the end of outputting the monitored value by the optical transceiver 10.

As shown in FIG. 5, when the optical transceiver 10 receives the request for outputting the monitored value from the connected user circuit (Step S101), the optical transceiver 10 switches the connection to the reference-voltage-supply side, and obtains the output A/D value "121" which is converted from the reference voltage of the reference voltage source (Step S102).

After the optical transceiver 10 obtains the output A/D value "121" which is A/D-converted from the reference voltage, the optical transceiver 10 obtains the correction data "120" stored in the EEPROM 52 (Step S103). After that, the optical transceiver 10 calculates the variation "1" of output characteristic based on the difference between the A/D value which is A/D-converted from the reference voltage and the obtained correction data "120" (Step S104).

The optical transceiver 10 switches the connection from the reference-voltage-supply side to the amplifier 40 side to convert the PD current, which fluctuates depending on the intensity of input light, into voltage and amplifies the voltage, to thereby obtain the output A/D value "150" which is A/D-converted from the amplified voltage (Step S105).

The optical transceiver 10 corrects the A/D-converted A/D value on the amplifier 40 side based on the output A/D-converted A/D value "150" on the amplifier 40 side and the calculated variation "1" on the reference-voltage-supply side, to thereby calculate the value "149". The optical transceiver 10 outputs the corrected A/D value "149" as the monitored value and the calculation parameter stored in the EEPROM 51 to the connected user circuit (Step S106).

The parameter is, for example, obtained by changing and performing A/D conversion on the light-input power several times, and calculating an approximate curve of the output A/D-converted monitored value in preparing the optical transceiver 10.

As described above, the optical transceiver 10 previously stores the output A/D value which is A/D-converted from the reference voltage in preparing the optical transceiver 10 in the predetermined memory. When the optical transceiver 10 receives the request for outputting the monitored value from the connected external device, the optical transceiver 10 calculates the variation based on the difference between the correction data and the A/D value which is A/D-converted from the reference voltage at the timing when the request for outputting the monitored value is received. The optical transceiver 10 uses the calculated variation to correct the A/D value obtained from the PD current of light-input power which is input thereinto, and outputs the corrected A/D value to the connected external device as the monitored value. Thus, the optical transceiver 10 can enhance accuracy of monitoring the light-input power, and suppress errors of the output monitored value.

For example, the optical transceiver 10 stores as the correction data the output A/D value "120" which is A/D-converted from the reference voltage in preparing the optical transceiver 10 in the EEPROM 52. When the optical transceiver 10 receives the request for outputting the monitored value from the connected user circuit, the optical transceiver 10 switches the connection to the reference-voltage-supply side. When the connection is switched to the reference-voltage-supply side, the optical transceiver 10 A/D-converts the reference voltage of the reference voltage source to thereby obtain the A/D value "121". After that, the optical transceiver 10 calculates the variation "1" of output characteristic based on the difference between the correction data "120" stored in the EEPROM 52 and the obtained A/D value "121". The optical transceiver 10 switches the connection from the reference-voltage-supply side to the light-input-power side. Then, the optical transceiver converts the PD current, which fluctuates depending on the intensity of input light, into voltage, amplifies the voltage, and A/D-converts the amplifies voltage, to thereby obtain the A/D value "150". The optical transceiver 10 corrects the obtained A/D value "150" based on the obtained A/D value "150" and the calculated variation "1" to thereby calculate the value "149". The optical transceiver 10 outputs the corrected A/D value "149" of the voltage on the light-input-power side to the connected user circuit as the monitored value. As a result, even when the monitored value fluctuates due to the change in temperature of the surrounding environment, the A/D converter 54, or the like, the optical transceiver 10 can enhance accuracy of monitoring the light-input power, and suppress the errors of the output monitored value.

Further, since the optical transceiver 10 sets the connected reference voltage source to the value which is output by the amplifier 40 when the light-input power into the optical transceiver 10 is around a lower limit thereof, the optical transceiver 10 can correct errors of the output monitored value even more accurately.

Second Embodiment

The present invention can be applied as various embodiments which are different from the above-described embodiment. A different embodiment is described with respect to (1) a configuration of the optical transceiver, and (2) correction of the monitored value.

(1) Configuration of Optical Transceiver

The procedure, the control procedure, the specific names, and the information including various data and parameters (e.g., information including various data and parameters stored in the "EEPROM 51" and "EEPROM 52" shown in FIG. 2) described above or shown in accompanying drawings may be arbitrarily changed.

Further, each configuration element of each apparatus represents just a concept of the function, and thus the apparatuses do not necessarily require the same physical configuration. Specifically, a manner of division/integration of each element is not limited to that shown in figures, for example, the switch control unit 53, the A/D converter 54, and the CPU 50 may be arranged outside. Depending on various types of loads and use conditions, all or some part of the configuration may be divided/integrated functionally or physically on any unit basis. Further, all or some part of each process of each apparatus may be achieved by a CPU and a program analyzed and executed the CPU, or may be achieved as hardware based on wired logic.

(2) Correction of Monitored Value

In the first embodiment described above, the variation is calculated by subtracting the correction data from the A/D value of the reference voltage, and the monitored value which is corrected by subtracting the variation from the output A/D value is output. The present invention, however, is not limited to the embodiment above. The output A/D value may be corrected depending on whether the calculated variation is positive or negative. For example, when the variation is calculated as being positive, the optical transceiver corrects the A/D value by subtracting the variation from the output A/D value whereas when the variation is calculated as being negative, the optical transceiver corrects the A/D value by adding the variation to the output A/D value.

An optical transceiver according to an embodiment improves accuracy of monitoring light-input power, thereby suppressing errors of an output monitored value.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An optical transceiver, comprising:
   a correction-data storage unit that stores therein a digital value of reference voltage obtained from a reference voltage source which supplies a reference voltage for an operation of a control circuit in preparing the optical transceiver;
   a reference-voltage converter that obtains, when a request for outputting the reference voltage is obtained from an external device connected with the optical transceiver after the preparation of the optical transceiver, the reference voltage from the reference voltage source, and converts the obtained reference voltage into a digital value;
   a variation calculating unit that calculates a variation of an output characteristic based on a difference between the digital value of the reference voltage converted by the reference-voltage converter and the correction data stored in the correction-data storage unit;
   an input-light-voltage converter that converts a current which fluctuates depending on an intensity of the input light, into a voltage, amplifies the voltage, and converts the obtained voltage into a digital value; and
   an output unit that corrects the digital value converted by the input-light-voltage converter based on the digital value of the voltage converted by the input-light-voltage converter and on the variation calculated by the variation calculating unit, and outputs the corrected digital value as a monitored value to the connected external device.

2. The optical transceiver according to claim 1, wherein the reference voltage is set to the voltage amplified by the input-light-converter when the intensity of the input light is at or around a lower limit of a dynamic range of the optical transceiver.

3. The optical transceiver according to claim 1, wherein the variation calculating unit calculates the variation of the output characteristic by subtracting the value of the correction data stored in the correction-data storage unit from the digital value of the reference voltage converted by the reference-voltage converter; and
   the output unit corrects the digital value of the voltage, when the variation calculated by the variation calculating unit is positive, by subtracting the variation calculated by the variation calculating unit from the digital value of the voltage converted by the input-light-voltage converter, and when the variation calculated by the variation calculating unit is negative, by adding the variation calculated by the variation calculating unit to the digital value of the voltage converted by the input-light-voltage converter, to output the corrected digital value as the monitored value to the external device.

* * * * *